US005846672A

United States Patent [19]

Bennett

[11] Patent Number: 5,846,672

[45] Date of Patent: Dec. 8, 1998

[54] INDENTED ELECTRODE CUP FOR A MINIATURE GALVANIC CELL

[75] Inventor: William R. Bennett, North Olmsted, Ohio

[73] Assignee: Eveready Battery Company, Inc., St. Louis, Mo.

[21] Appl. No.: 970,976

[22] Filed: Nov. 14, 1997

[51] Int. Cl.[6] .............................. H01M 2/08; H01M 6/08

[52] U.S. Cl. ............................................ 429/164; 429/174

[58] Field of Search .................................... 429/163, 164, 429/174, 185, 162, 172

[56] References Cited

U.S. PATENT DOCUMENTS

| | | | |
|---|---|---|---|
| 4,302,517 | 11/1981 | Dziak | 429/66 |
| 5,567,538 | 10/1996 | Oltman et al. | 429/174 X |
| 5,576,117 | 11/1996 | Morita et al. | 429/162 |
| 5,601,944 | 2/1997 | Yamaguchi et al. | 429/174 |
| 5,712,053 | 1/1998 | Malay | 429/162 |
| 5,712,058 | 1/1998 | Malay | 429/162 |

FOREIGN PATENT DOCUMENTS

| | | |
|---|---|---|
| 60-241641 | 11/1985 | Japan . |

*Primary Examiner*—Anthony Skapars
*Attorney, Agent, or Firm*—Robert W. Welsh

[57] ABSTRACT

A miniature galvanic cell employing a cell housing comprising an indented cup, such as a beaded cup, and can wherein the indented area is disposed at the vicinity of the open end of the cup so that effectively the majority of the cross-section thickness of the vertical portion of the cell is attributed to the thickness of the wall of the cup so that maximum internal volume of the cell is reserved for the active components. A process for producing the novel housing is also disclosed.

16 Claims, 2 Drawing Sheets

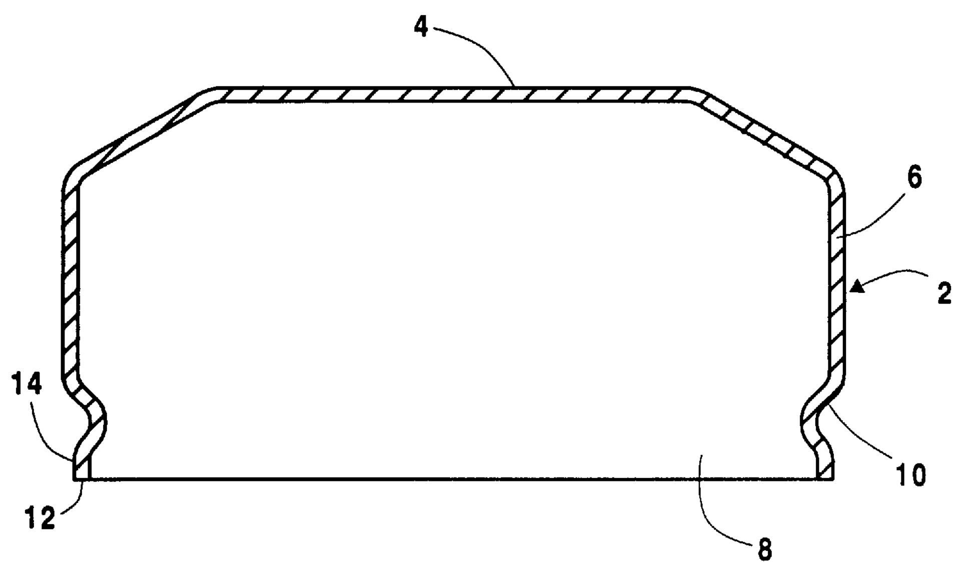
Fig. 1
28 24 26
20
22
Fig. 2
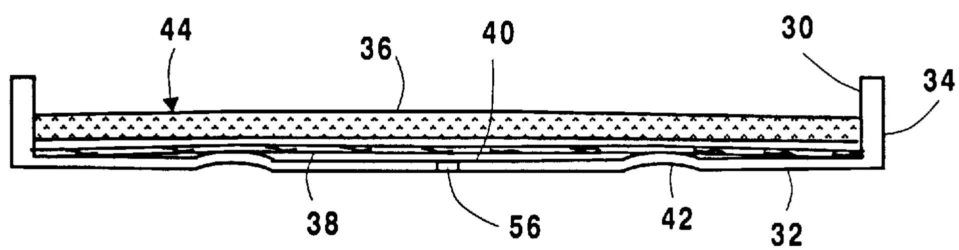
Fig. 3

INDENTED ELECTRODE CUP FOR A MINIATURE GALVANIC CELL

FIELD OF THE INVENTION

This invention relates to a miniature type galvanic cell employing an indented contour cup and can assembly that occupies a relatively small volume so that the internal volume of this cell is reserved primarily for the active components of the cell. This invention also relates to a process for producing a miniature galvanic cell having optimum internal volume for the active components of the cell.

BACKGROUND OF THE INVENTION

The miniaturization of electronic devices has created a demand for small but powerful electrochemical cells. Cells that utilize an alkaline electrolyte are known to provide high energy density per unit volume, and are therefore well suited for applications in miniature electronic devices such as hearing aids, cameras, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell's cup and can so as to provide a seal for the cell. Generally, the gasket must be made of a material inert to the electrolyte contained in the cell and the cell environment. In addition, it must be flexible and resistant to cold flow under pressure of the seal and maintain these characteristics so as to insure a proper seal during long periods of storage. Material such as nylon, polypropylene, ethylene-tetrafluoroethylene copolymer and high density polyethylene have been found to be suitable as gasket materials for most applications. Typically, the insulating gasket is in the form of a “J” shaped configuration in which the extended wall of the cup is inserted so that upon being radially squeezed, the bottom portion of the gasket forms a seal with the bottom portion of the wall of the cup. The gasket generally extends the entire length of the internal wall of the cell. The volume of the gasket could exceed as much as 20% of the internal volume of the cell and therefore results in a waste of space in the cell for the active components of the cell. To better insure a good seal, a sealant is generally applied to the gasket, including its “U” shaped groove, so that upon insertion of the cup into the gasket, the edge of the extended wall of the cup will seat in the sealant and then upon the application of a compressive force, the wall of the gasket will be compressed against the edge of the extended cup wall.

U.S. Pat. No. 4,302,517 discloses a sealed galvanic cell employing an insulating gasket between the can and the cup of the cell. The cell is composed of a first sealing segment disposed and compressed between the rim of the can and the edge of the cup and a second can support segment extending within the cup and substantially parallel to the wall of the cup and defining a plurality of spaced apart openings which accommodate the cell's electrolyte and/or the cell's reaction product.

It is an object of the present invention to provide a miniature cell structure that employs an indented cup and can housing that occupies a minimum internal volume for the cell.

It is another object of the present invention to provide an indented cup and can housing for a miniature cylindrical cell that uses a low profile type of “J” gasket disposed between the cup and can to electrically insulate the cup from the can and to provide a seal for the miniature cell so that the cell has a large internal volume for its active components.

It is another object of the present invention to provide a novel indented cup and can housing for a cell that is easy to make, cost effective to produce and easy to assemble.

It is another object of the present invention to provide a process for producing a miniature cell with a novel indented cup and can housing occupying a minimum volume for the cell.

The foregoing and additional objects of the present invention will become more fully apparent from the following description and drawings.

DESCRIPTION OF THE INVENTION

One aspect of this invention is a galvanic cell having a first electrode a second electrode of opposite polarity, a separator between the electrodes and an electrolyte, all disposed within a two-part electrically conductive housing, one part of which is a can which is electrically connected to the first electrode and the other part of which is a cup which is electrically connected to the second electrode. The can has a wall with an edge defining an opening. The cup has an upstanding wall with an outer surface and an edge end defining an opening as well as an inward indented area in the vicinity of the open end of the cup. Between the can and the cup is an insulating gasket having a base member with a bottom surface contacting the first electrode, an outer wall having a top edge, and an inner wall spaced apart from the outer wall thereby defining a “U” shaped groove. The edge of the cup's wall is disposed within the groove of the gasket, the outer wall of the gasket is disposed between the wall of the can and the wall of the cup, the outer wall of the gasket has a height sufficient so that the top edge of the gasket's outer wall is disposed on the outer surface of the cup's wall at the indented area, and the edge of the can's wall is secured against the gasket thereby sealing the can to the cup at the indented area of the cup via the gasket.

As used herein, “indented area” shall mean any distortion of the cup's wall that produces a disturbed area such as a bead, rim or any other geometrically indented contour.

The vertically located center point of the indented area should preferably be located between 5% and 40% of the vertical length of the upstanding wall of the cup measured from the open edge of the wall, more preferably located between 8% and 30% of the vertical length of the upstanding wall and most preferably located between 10% and 25% of the vertical length of the upstanding wall of the cup.

The cup of the housing of the present invention preferably has a beaded contour at the vicinity of its open end. The can of the housing of the present invention has an upstanding peripheral wall that is much smaller in height than the conventional upstanding peripheral wall of cans of cells of the prior art. In conventional types of miniature galvanic cells, the height of the upstanding peripheral wall of the gasket usually extends the entire height of the can's upstanding peripheral wall. This type of conventional housing for miniature galvanic cells requires that the thickness of the housing includes a three-wall assembly: (1) can wall, (2)

gasket wall and (3) cup wall. The internal volume for the conventional type housing for a fixed size cell is reduced by the thickness of the three-wall assembly. This results in a waste of space in the cell for active components of the cell. Contrary to this type of conventional miniature galvanic cell, the novel housing for miniature cells of the present invention preferably employs a beaded cup and can housing that provides only a single wall thickness (the cup's upstanding wall) for the vertical component of the housing, and thereby the internal volume of the housing is maximized to accommodate more of the active materials of the cell. Specifically, the beaded area of the cup is disposed at the vicinity of the open end of the cup so that the majority of the height of the upstanding peripheral wall of the cup is disposed above the beaded area so that the cross-sectional thickness of the housing is substantially composed only of the thickness of the wall of the cup.

In a preferable embodiment of the invention, the cup is formed so that the edge of the cup's upstanding wall is deformed to a degree sufficient to accommodate at least a fraction of the thickness of the outer wall of the gasket and thickness of the upstanding wall of the can so that the average external diameter of the cup above the indented area is between about 95% and about 105% of the average external diameter of the can. Preferably, the average external diameter of the cup is between 97% and 103% and more preferably about 100% of the average external diameter of the upstanding wall of the can. Preferably the cup's upstanding wall is deformed inwardly so that the average external diameter of the cup is about equal to the average external diameter of the can.

Another aspect of this invention is a process for assembling the components of a cell into a two-part conductive housing in which one part is a cup and the other part is a can, comprising the steps:

a) preparing a conductive cup having a peripheral wall terminating with an edge end defining an opening, and preparing an indented area at the vicinity of the open end;

b) preparing an electrically insulating gasket with a base member having an inner upstanding wall and an outer upstanding wall terminating with an edge, said walls being spaced apart to define a "U" shaped groove;

c) preparing a conductive can with a peripheral wall having an edge defining an opening for the can;

d) placing the components of the cell within the cup and can and then placing the can over the cup so that the wall of the can is in parallel alignment with the wall of the cup, the gasket is disposed in physical contact between the wall of the cup and the wall of the can, and the edge of the outer wall of the gasket is disposed at the indented area of the cup; and e) securing the edge of the wall of the can onto the outer wall of the gasket and onto the wall of the cup so as to effectively seal the can to the cup via the gasket and thereby electrically insulate the can from the cup.

In step a) of the process of this invention, the indented area of the cup can be formed by inwardly deforming the area at the vicinity of the open end of the upstanding wall of the cup. Preferably, the area should be deformed to a degree that is between 90% and 110% of the sum of the thickness of the outer wall of the gasket and the upstanding wall of the can. Preferably, the depth measured in the indented area could be between about 95% and 105% of the sum of the thickness of the outer wall of the gasket and the upstanding wall of the can, and more preferably about 100% of the sum of the thickness of the outer wall of the gasket and the upstanding wall of the can.

The novel housing geometeries of this invention accomplish two important benefits. First, the removal of the upstanding wall of the can and outer wall of the gasket above the indented area allows the negative cup compartment to be expanded without increasing the outer diameter of the cell. Second, by locating the seal closer to the gasket and positive electrode, the seal will be a stronger seal.

In some applications, a conductive label may be required to provide an electrical contact point at the side of the cell. This feature can be accomplished by utilizing a film having an electrically insulating adhesive inner layer adapted to be secured to the negative cup wall. The outer layer would be an electrically conductive surface that would provide electrical contact to the can of the cell and therefore the side of the cell would serve as the terminal of the can or positive terminal.

The gasket of the invention comprises a material selected with consideration given to its stability in the presence of the electrolyte, its resiliency, and its resistance to cold flow. Suitable polymeric materials include nylon, polytetrafluoroethylene, fluorinated ethylene-propylene, chlorotrifluoroethylene, perfluoro-alkoxy polymer, polyvinyls, polyethylene, polypropylene, polystyrene and the like. Other suitable materials would be recognizable by one skilled in the art. In some applications, additional precautions can be used in conjunction with the gasket of this invention to provide a more effective seal, such as coating selected areas of the gasket with a sealing agent such as a fatty polyamide resin or asphalt.

BRIEF DESCRIPTION OF THE INVENTION

The present invention will become apparent from the following description thereof when considered together with the accompanying drawings which are set forth above as being exemplary of embodiments of the present invention and are not intended, in any way, to be limitative thereof and wherein:

FIG. 1 is a cross-sectional view of an negative cup for use in an air depolarized cell.

FIG. 2 is a cross-sectional view of a low profile gasket for use in this invention.

FIG. 3 is a cross-sectional view of low profile can containing a positive electrode in accordance with this invention.

DETAILED DESCRIPTION OF THE DRAWINGS

Figure 4:
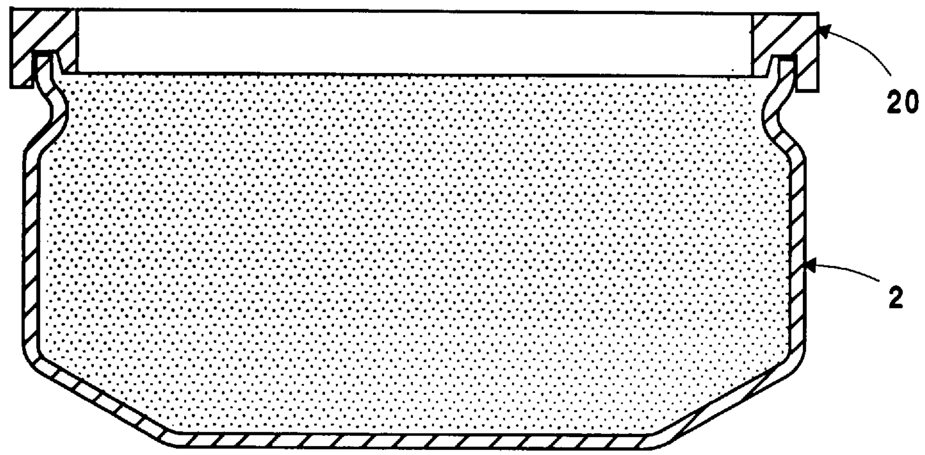
FIG. 4 is a cross-sectional view of cup of FIG. 1 containing the gasket of FIG. 2 and an anode.

FIG. 1 shows a circular cup 2 having a base member 4 and an upstanding peripheral wall 6 defining an opening 8. Disposed at the vicinity of the open end 8 of the upstanding wall 6 is an inwardly formed bead 10. The upstanding wall 6 is terminated with an edge 12 shown substantially in line with upstanding wall 6. If desired, the edge portion 14 could be further deformed to a degree such that the outer wall of the edge portion 14 would be indented to a depth equal to the sum of the thickness of the gasket 20 of FIG. 2 and the thickness of the upstanding wall 34 of FIG. 3. In this type of embodiment (not shown), the average outside diameter of the cup 2 could be equal to the average outside diameter of the can 30. It is to be understood that the degree of deformation of the area 10 formed by the bead contour can vary depending on the specific application of the desired housing geometry.

FIG. 2 shows a low profile gasket 20 comprising a base member 22, an inner wall 24 and an outer wall 26. Inner wall 24 and outer wall 26 define a groove 28.

FIG. 3 shows a circular can 30 having a base member 32 and upstanding wall 34. Positive electrode 36, air distribution member 38, and a layer of polytetrafluoroethylene 40 are disposed at the bottom of the can 30. The positive electrode 36, generally called an air electrode, can comprise manganese dioxide, activated carbon, and electroconducting acetylene black, with further addition of polytetrafluorethylene (PTFE) dispersion, providing a mix that can be applied on a metallic screen. The layer of polytetrafluoroethylene 40 covers the entire base 32 of can 30 including the air distribution membrane 38. The can 30 can have patterned internal embossed sections 42 to provide a defined gap for uniform air distribution across the surface of an electrode 36 which is disposed within can 30. The electrode assembly 44 containing member 39 and electrode 36 and polytetrafluoroethylene layer 40, can be secured within the can 30 by conventional means.

Figure 5:
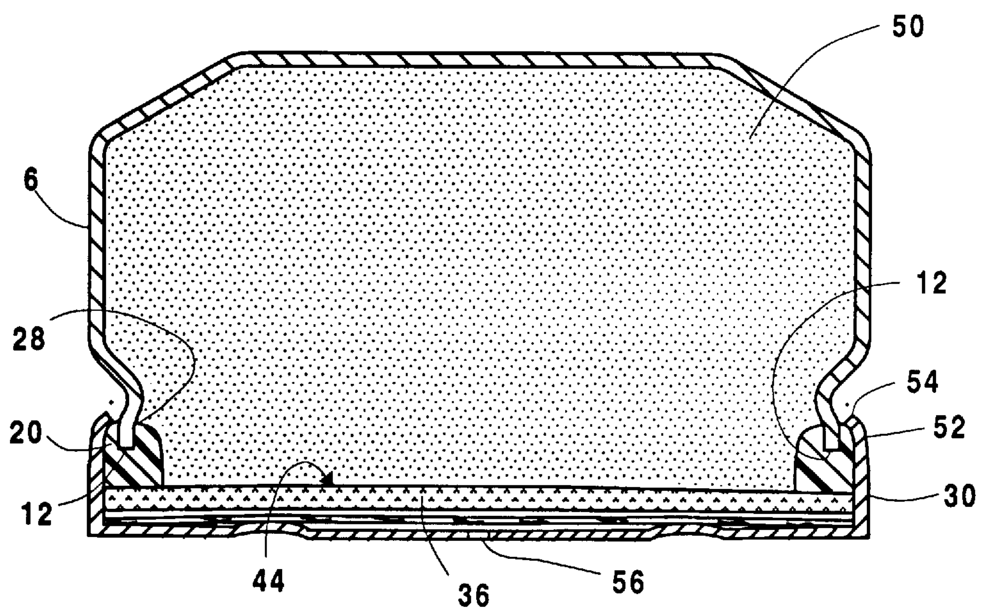
FIG. 5 is a cross-sectional view of a cell containing the cup, gasket and negative electrode of FIG. 1 inverted over the can with the positive electrode of FIG. 3 after the wall of the can was crimped to provide a sealed cell.

FIGS. 4 and 5 show a cup 2 with a negative electrode 50 comprising zinc powder, placed in the cup 2 and making electronic contact with the cup 2. The negative electrode 50 can comprise a mixture of zinc particles, electrolyte and organic compounds such as binders which make up the battery's negative electrode 50. The cup 2 can be made from a trilaminate material comprising copper that has been laminated to the bare side of a nickel-clad steel strip. A nickel layer could be used to protect the exterior surface of the steel strip. Other laminated materials from which the cup may be made include: a bilaminate of copper on a stainless steel substrate or a laminate made from more than three layers. Round disks punched from this laminated metal strip are then formed into a cup. The copper layer forms the inside surface of the cup and directly contacts the negative electrode mixture.

As shown in FIG. 5, the can 30 along with the inserted electrode assembly 44 is disposed below the cup 2 which is preassembled according to this invention and contains negative electrode 50. The edge 12 of the wall 6 of the cup 2 is shown secured in groove 28 of gasket 20 and the gasket is seated on electrode 36. The rim 54 of can 30 is then compressed against the electrically insulating gasket 20 between the cup 2 and the can 30 thereby forming a seal and an electrical barrier between the can 30 and the cup 2.

As shown in FIGS. 3 and 5, hole 56 is punched into the bottom of can 30 to act as an air-entering port. The cell shown in FIG. 5 has the can 30 in electrical contact with electrode 36 and the cup 2 in electrical contact with electrode 50 and thus the terminals of the cell are at opposite ends.

It is to be understood that modifications and changes to the preferred embodiment of the invention herein shown and described can be made without departing from the spirit and scope of the invention.

What is claimed:

1. A galvanic cell comprising:

a) a first electrode having a polarity;

b) a second electrode of opposite polarity;

c) a separator between said first electrode and said second electrode;

d) an electrolyte;

e) a two-part conductive housing containing said first electrode, said second electrode, said separator and said electrolyte, the first part of said housing being a can electrically connected to said first electrode and having a wall and an edge defining an opening, and the second part of said housing being a cup electrically connected to said second electrode, having an upstanding wall with an outer surface and an edge end defining an opening, and having an inward indented area at the vicinity of the open end of the cup; and f) an insulating gasket comprising a base member having a bottom surface contacting said first electrode, an outer wall having a top edge, and an inner wall spaced apart from the outer wall thereby defining a "U" shaped groove; wherein the edge of the cup's wall is disposed within the groove of said gasket, the outer wall of said gasket is disposed between the wall of the can and the wall of the cup, the outer wall of said gasket has a height sufficient so that the top edge of said gasket's outer wall is disposed on the outer surface of the cup's wall at the indented area, and the edge of the can's wall is secured against said gasket thereby sealing the can to the cup at the indented area of the cup via said gasket.

2. The galvanic cell of claim 1 wherein the indented area of the cup has a bead contour.

3. The galvanic cell of claim 1 wherein the indented area of the cup has a center point on the indented area measured on the vertical axis of the cell, and the center point is located between about 5% to about 40% of the length of the upstanding wall of the cup measured from the open end of the upstanding wall of the cup.

4. The galvanic cell of claim 3 wherein the indented area of the cup has a center point on the indented area measured on the vertical axis of the cell, and the center point is located between about 8% to about 30% of the vertical length of the upstanding wall of the cup measured from the open end of the upstanding wall of the cup.

5. The galvanic cell of claim 4 wherein the indented area of the cup has a center point on the indented area measured on the vertical axis of the cell, and the center point is located between about 10% to about 25% of the vertical length of the upstanding wall of the cup measured from the open end of the upstanding wall of the cup.

6. The galvanic cell of claim 2 wherein the indented area of the cup has a center point on the indented area measured on the vertical axis of the cell, and the center point is located between about 5% to about 40% of the length of the upstanding wall of the cup measured from the open end of the upstanding wall of the cup.

7. The galvanic cell of claim 1 wherein the average external diameter of the cup above the indented area is between about 95% and about 105% of the average external diameter of the can.

8. The galvanic cell of claim 7 wherein the average external diameter of the cup above the indented area is between about 97% and about 103% of the average external diameter of the can.

9. The galvanic cell of claim 8 wherein the average external diameter of the cup above the indented area is about 100% of the average external diameter of the can.

10. The galvanic cell of claim 1 wherein the cell is an air depolarized cell.

11. The galvanic cell of claim 10 wherein said second electrode is a negative electrode.

12. The galvanic cell of claim 11 wherein the negative electrode comprises zinc.

13. The galvanic cell of claim 1 wherein the edge end of the cup's upstanding wall is indented to a depth of between 90% and 110% of the sum of the thickness of the outer wall of said gasket and the upstanding wall of the can.

14. The galvanic cell of claim 13 wherein the edge end of the cup's upstanding wall is indented to a depth of between 95% and 105% of the sum of the thickness of the outer wall of said gasket and the upstanding wall of the can.

15. The galvanic cell of claim 2 wherein the edge end of the cup's upstanding wall is indented to a depth of between 95% and 105% of the sum of the thickness of the outer wall of said gasket and the upstanding wall of the can.

16. The galvanic cell of claim 1 wherein said gasket is made of a material selected from the group consisting of nylon, polytetrafluoroethylene, fluorinated ethylene-propylene, chlorotrifluoroethylene, perfluoro-alkoxy polymer, polyvinyls, polyethylene, polypropylene and polystyrene.

* * * * *